(12) United States Patent
Nagelsdiek et al.

(10) Patent No.: US 9,403,719 B2
(45) Date of Patent: Aug. 2, 2016

(54) CURABLE POLYMER MIXTURES

(75) Inventors: René Nagelsdiek, Hamminkeln (DE); Bernd Göbelt, Wesel (DE); Wolfgang Pritschins, Wesel (DE); Dorothée Greefrath, Mülheim an der Ruhr (DE); Stephan Remme, Kamp-Lintfort (DE); Andrea Esser, Wesel (DE)

(73) Assignee: BYK-Chemie GmbH, Wesel (DE)

( * ) Notice: Subject to any disclaimer, the term of this patent is extended or adjusted under 35 U.S.C. 154(b) by 1164 days.

(21) Appl. No.: 13/057,883

(22) PCT Filed: Aug. 19, 2009

(86) PCT No.: PCT/EP2009/005993

§ 371 (c)(1),
(2), (4) Date: Apr. 12, 2011

(87) PCT Pub. No.: WO2010/020401

PCT Pub. Date: Feb. 25, 2010

(65) Prior Publication Data

US 2011/0190420 A1  Aug. 4, 2011

(30) Foreign Application Priority Data

Aug. 19, 2008  (DE) .................. 10 2008 038 407

(51) Int. Cl.

| | |
|---|---|
| *C04B 26/14* | (2006.01) |
| *C08G 59/02* | (2006.01) |
| *C08G 59/42* | (2006.01) |
| *C08G 59/44* | (2006.01) |
| *C08G 59/50* | (2006.01) |
| *C08L 63/00* | (2006.01) |
| *C04B 14/04* | (2006.01) |
| *C08L 101/10* | (2006.01) |
| *C08G 18/71* | (2006.01) |
| *C08G 59/40* | (2006.01) |
| *C04B 111/00* | (2006.01) |
| *C04B 111/54* | (2006.01) |
| *C04B 111/72* | (2006.01) |

(52) U.S. Cl.
CPC .............. *C04B 26/14* (2013.01); *C08G 18/718* (2013.01); *C08G 59/4085* (2013.01); *C08G 59/50* (2013.01); *C08L 63/00* (2013.01); *C04B 2111/00482* (2013.01); *C04B 2111/00655* (2013.01); *C04B 2111/00844* (2013.01); *C04B 2111/00939* (2013.01); *C04B 2111/00948* (2013.01); *C04B 2111/00982* (2013.01); *C04B 2111/542* (2013.01); *C04B 2111/72* (2013.01)

(58) Field of Classification Search
CPC ..................... C04B 26/14; C04B 2111/00982; C04B 2111/00844; C04B 2111/00482; C04B 2111/00939; C04B 2111/00948; C04B 2111/542; C04B 2111/72; C04B 2111/00; C08G 59/50; C08G 59/4085; C08G 18/718; C08L 63/00

USPC .......... 523/400, 427, 428, 457, 466; 524/188, 524/506, 114, 197, 262; 549/524, 525; 525/523, 529, 528, 530, 533

See application file for complete search history.

(56) References Cited

U.S. PATENT DOCUMENTS

| | | | | |
|---|---|---|---|---|
| 4,689,358 | A | * | 8/1987 | Schorr et al. .................. 523/209 |
| 5,684,094 | A | * | 11/1997 | Suzuki et al. ................. 525/403 |
| 8,153,722 | B2 | * | 4/2012 | Nagelsdiek et al. .......... 524/506 |
| 2006/0128919 | A1 | * | 6/2006 | Okamoto et al. .............. 528/25 |

FOREIGN PATENT DOCUMENTS

| | | | |
|---|---|---|---|
| DE | 10 2005 046 641 | A1 | 4/2007 |
| EP | 0 570 611 | A1 | 11/1993 |
| JP | 05-217704 | A | 8/1993 |
| JP | 09291135 | A * | 11/1997 |
| JP | 09-316350 | A | 12/1997 |
| JP | 10-025391 | * | 1/1998 |
| WO | 2007/111452 | A1 | 10/2007 |

OTHER PUBLICATIONS

International Search Report dated Mar. 9, 2010.
Kinjo et al., "Epoxy Molding Compounds as Encapsulation Materials for Microelectronic Devices", Adv. Polym. Sci., vol. 88, p. 1-48, 1989.
Aurer et al. "Unsaturated Polyester Resins", Verlag Moderne Industrie, pp. 1-72, 2003.
E. Brandau, 1993, Duroplastwerkstoffe.
Ellis, "Chemistry and Technology of Epoxy Resins", Department of Engineering Materials University of Sheffield, 1993, Table of Contents.
John E. Sohn, "Improved Matrix-Filler Adhesion", J. Adhesion, vol. 19, pp. 15-27, 1985.
Harada et al., "Influence of Network Chain Orientation on the Mechanical Property of Epoxy Resin Filled with Silica Particles", J. Appl. Polym. Sci,; vol. 87, pp. 787-794, 2003.
Kim et al.., "Physical Properties of Epoxy Molding Compound for Semiconductor Encapsulation According to the Coupling Treatment Process Change of Silica", J. Appl. Polym. Sci., vol. 65, 1975-1982 , 1997.

(Continued)

*Primary Examiner* — Randy Gulakowski
*Assistant Examiner* — Ha S Nguyen
(74) *Attorney, Agent, or Firm* — Norris McLaughlin & Marcus PA

(57) ABSTRACT

Curable polymer mixtures comprising at least one oligomeric addition product with hydrolyzable silane groups and additional functional groups as the mediator additive, and a curable polymer system having epoxy group-carrying polymers and curing agents, fillers and optionally addditives; polymer concrete mixtures and molded bodies produced therefrom.

20 Claims, No Drawings

(56) References Cited

OTHER PUBLICATIONS

Poomalai et al., "Thermal and Mechanical Properties of Poly(methylmethacrylate) and Ethylene Vinyl Acetate Copolymer Blends", J. Appl. Polym. Sci., vol. 106, pp. 684-691, 2007.
Su et al., "Novel Adamantane-Containing Epoxy Resin", J. Appl. Polym. Sci., vol. 106, pp. 737-742, 2007.
Ko et al., "Effect of Surface Modification of Fillers on the Properties of IC Encapsulating Compounds", Korea Polymer Journal, vol. 5, No. 3, pp. 160-165., 1997.
Lee, "Handbood of Epoxy Resins", McGraw Hill 1982, Table of contents.
Bonnet et al., Epoxy-Diamine Thermoset/Thermoplastic Blends. 2. Rheological Behavior before and after Phase Separation, Macromolecules, vol. 32, No. 25, pp. 8524-8530, 1999.
Jenkins et al., "Studios of Silane Adhesion Promoters of Silica Filler Particles for Use In Microelectronic Packaging", Mat. Res. Soc. Symp. Proc., vol. 710, pp. 159-164, 2002.
May, Clayton A., "Epoxy resins", Chemistry and Technology 2nd Edition, 1988, Preface and Tables of Contents.
Mökel et al., "Epoxidharze", Verlag Moderne Industrie, pp. 1-38, 1996.
Nakamura et al., "Effects of Particle Shape, Size and Interfacial Adhesion on the Fracture Strength of Silica-filled Epoxy Resin", Polymers & Polymer Composites, vol. 7, No. 3, pp. 177-186, 1999.
Roulin-Moloney et al., "Parameters Determining the Strength and Toughness of Particulate-Filled Epoxy Resins", Polymer Composites, vol. 8, No. 5, pp. 314-323, 1987.
Varley et al., "Toughening of a Trifunctional Epoxy System Part III. Kinetic and Morphological Study of the Thermoplastic Modified Cure Process", Polymer, vol. 41, pp. 3425-3536, 2000.
Potter, W.G., "Use of Epoxy Resins", 1st American Edition 1975, (Contents).
R. Burns, "Polyester Molding Compounds", Plastics Engineering, Marcel Dekker, Inc. 1982, Table of Contents.
Skudelny, "Silanisiertes Quarzmehl, ein Spezifischer Füllstoff Für Gießharz-Formstoffe", Kunststoffe, vol. 68, pp. 65-71, 1978.
Stoye Freitag, "Chemie Eigenschaften Anwendung", Hanser, 1996. (Cover Page).
Technical Information, "Surface Protection II", Apr. 1996.
Technical Information, "Surface Protection I", Nov. 1994.
UPPC, "Polypox Glycidether", Übersicht Lieferprogramm, Apr. 2005.

* cited by examiner

CURABLE POLYMER MIXTURES

This is a 371 of PCT/EP2009/005993 filed 19 Aug. 2009 (international filing date), which claims priority of German application DE 10 2008 038 407.0filed Aug. 19, 2008.

The present invention relates to curable, aggregate-comprising polymer mixtures comprising I) at least one at least oligomeric addition product having hydrolyzable silane groups and further functional groups, preferably amino groups, as additive and II) a curable system comprising at least one curable polymer having at least coupling epoxide groups, at least one hardener component and optionally an accelerator as binder and also IV) optionally conventional two auxiliaries, the production thereof and also the use thereof for cured polymer-containing shaped bodies, preferably for polymer concrete, in any form.

BACKGROND OF THE INVENTION

Curable polymer mixtures of various compositions are used in many ways, including use for the production of polymer concrete.

Polymer concretes are known materials which, in contrast to normal concrete have a polymer as binder which holds together the rock particles, known as aggregates. The aggregates can have a variety of rock particle sizes and are usually used in the range from very fine particles to coarse particles. This allows degrees of fill of up to 95% by weight depending on the mixture of the various particle sizes. As polymeric binders, it is possible to use various polymers such as epoxy resin systems which, after curing, give the polymer matrix in which the aggregates are distributed, viz. the polymer concrete.

It is important for the quality of a polymer concrete that it has excellent mechanical properties, e.g. flexural strength, tensile strength, compressive strength and flexural impact strength, and also a satisfactory E modulus, which is brought about only by very good interaction, i.e. adhesion, between the polymer matrix and the aggregates which are bound together by means of the polymer matrix. The better this interaction, the higher the quality of the polymer concrete. This also applies to other, curable polymer mixtures having a particularly high degree of fill which are produced for the production of shaped bodies or shaped articles for further fields of use.

In addition, it is of critical importance that the as yet uncured polymer mixture has a low viscosity so as to allow simplified processing and giving the opportunity of increasing the degree of fill by means of fillers. However, despite a low viscosity, rapid curing of the polymer mixture to be cured should still be possible. The use of epoxy- or amino-functional low molecular weight alkoxysilanes for improving the mechanics of filled epoxy resins is described in various publications, e.g. in J. Appl. Polym. Sci. 2003, 87, 787, in Mat. Res. Soc. Symp. Proc. 2002, 710, 159, in Korea Polym. J. 1997, 5, 1760, in J. Appl. Polym. Sci. 1997, 65, 1975, in Polymer Composites 1987, 8, 314, in J. Adhesion 1985, 19, 15, in Polym. Polym. Composites 1999, 7, 177, in Kunststoffe 1978, 68, 65 or in Adv. Polym. Sci. 1989, 88, 1.

The use of these low molecular weight alkoxysilanes lead to liberation of relatively large amounts of alcohol which are formed in the hydrolysis of the alkoxysilane groups. These alcohols, e.g. methanol or ethanol, are not only undesirable by-products since they are volatile, readily flammable compounds but also represent a health risk, e.g. methanol because of its toxicity which leads to irreversible harm to human beings and animals when inhaled, swallowed or on contact with the skin and on other exposure.

In addition, the known polymer mixtures, in particular polymer concrete mixtures, based on epoxy resins for many fields of use do not have the desired abovementioned processing properties or the cured polymer articles obtained therefrom, preferably polymer concretes, do not always have the abovementioned mechanical properties to a satisfactory degree.

It was therefore an object of the present invention to provide curable polymer mixtures based on epoxy resins, preferably polymer concrete mixtures, which ensure improved processing with a significantly reduced environmental and safety risk, with the cured polymer compositions produced therefrom, preferably polymer concretes, even having improved mechanical properties compared to the abovementioned products.

SUMMARY OF THE INVENTION

This object is achieved by the provision of the curable polymer mixtures according to the invention, preferably curable polymer concrete mixtures, comprising
I) a) at least one at least oligomeric addition product
   of at least one aminosilane and optionally thiosilane having at least one hydrolyzable silane group or
   a combination of at least one such aminosilane and/or thiosilane and at least one further monoamine and/or polyamine having at least 2 amino groups
   onto at least one compound having at least two terminal, ethylenically unsaturated double bonds
and/or
   b) at least one at least oligomeric addition product
   of at least one isocyanatosilane and/or epoxysilane having at least one hydrolyzable silane group
   onto at least one compound having at least one terminal hydroxy group and at least one terminal, ethylenically unsaturated double bond in combination with at least one monoamine and/or polyamine having at least 2 amino groups
and/or
   c) at least one at least oligomeric addition product
   of at least one silane having at least one hydrolyzable group and at least one (meth)acrylate group
   or at least one silane having at least one hydrolyzable silane group and at least one cyclic dicarboxylic anhydride group
   onto at least one compound having at least two terminal amino groups
and/or
   d) at least one at least oligomeric addition product
   of at least one isocyanatosilane and/or epoxysilane having at least one hydrolyzable silane group
   onto at least one compound having at least two terminal amino groups optionally in combination with at least one further monoisocyanate and/or an epoxide compound
and/or
   e) at least one at least oligomeric addition product
   of at least one aminosilane and/or thiosilane having at least one hydrolyzable silane group
   onto at least one compound having at least two terminal epoxy groups as coupling additive,
II) as binder
   a curable system which comprises at least one polymer having at least two epoxide end groups and can be at least partially cured by interaction of the epoxide groups of this polymer with the amino groups of at least one of the components I) a)-d) and/or the epoxide groups of the component I) e) and at least one further hardener component and optionally an accelerator, III) at least 20% by weight, preferably at least 40% by weight, particularly preferably at least 60% by weight, based on the total weight of the polymer mixture, of inorganic, optionally multiparticulate fillers as aggregates and IV) optionally customary auxiliaries.

The use of these at least oligomeric addition products makes it possible to achieve improved processability of the polymer mixtures of the invention, in particular the polymer concrete mixtures, obtain cured products such as a polymer concrete having excellent mechanical properties, with the amount of alcohol liberated being at the same time significantly reduced compared to the known systems. This was neither rendered obvious by the prior art nor was it to be expected.

DETAILED DESCRIPTION

As addition products containing hydrolyzable silane groups and amino groups or epoxy groups as coupling additives in the curable polymer mixtures of the invention, preferably polymer concrete mixtures, preference is given to using I a) at least one at least oligomeric addition product
   of at least one aminosilane and optionally thiosilane having at least one hydrolyzable silane group or
   a combination of at least one such aminosilane and/or thiosilane and at least one further monoamine and/or polyamine having at least 2 amino groups
   onto at least one compound having at least two terminal, ethylenically unsaturated double bonds
and/or
I b) at least one at least oligomeric addition product
   of at least one isocyanatosilane and/or epoxysilane having at least one hydrolyzable silane group
   onto at least one compound having at least one terminal hydroxy group and at least one terminal, ethylenically unsaturated double bond in combination with at least one monoamine and/or polyamine having at least 2 amino groups
and/or
I c) at least one at least oligomeric addition product
   of at least one silane having at least one hydrolyzable silane group and at least one (meth)acrylate group
   or at least one silane having at least one hydrolyzable silane group and at least one cyclic dicarboxylic anhydride group
   onto at least one compound having at least two terminal amino groups
and/or
I d) at least one at least oligomeric addition product
   of at least one isocyanatosilane and/or epoxysilane having at least one hydrolyzable silane group
   onto at least one compound having at least two terminal amino groups optionally in combination with at least one further monoisocyanate and/or an epoxide compound
and/or
I e) at least one at least oligomeric addition product
   of at least one aminosilane and/or thiosilane having at least one hydrolyzable silane group
   onto at least one compound having at least two terminal epoxy groups.

As compounds having at least one hydrolyzable silane group, preference is given to compounds of the general formula

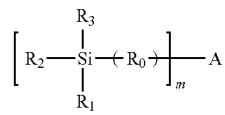

where
A is an epoxide group, a glycidyloxy group, an isocyanate group, an —SH group, a (meth)acrylate group, a cyclic dicarboxylic anhydride group or an —N(H)—X group, where X is hydrogen, an optionally branched alkyl radical having from 1 to 6 carbon atoms, an aryl radical having from 6 to 10 carbon atoms or a cycloalkyl radical having from 4 to 6 carbon atoms and each of these X radicals can be substituted by a primary or secondary amino group, or A is an —NH group when m is the integer 2,
$R_0$ is an optionally branched alkylene radical having from 1 to 12 carbon atoms, a cycloalkylene radical having from 4 to 6 carbon atoms or an arylene radical having from 6 to 10 carbon atoms,
$R_1$ is an optionally branched alkyl radical having from 1 to 7 carbon atoms, preferably from 1 to 3 carbon atoms, a halogen, an —O—C(=O)—$R_4$ group or —$OR_4$ group, where $R_4$ is hydrogen, a methoxyethyl group or an optionally branched alkyl radical having from 1 to 7 carbon atoms, preferably from 1 to 3 carbon atoms, or a cycloalkyl radical having from 4 to 6 carbon atoms,
$R_2$ is an optionally branched alkyl radical having from 1 to 7 carbon atoms, preferably from 1 to 3 carbon atoms, a halogen, an —O—C(=O)—$R_4$ group or an —$OR_4$ group, where $R_4$ is hydrogen, a methoxyethyl group or an optionally branched alkyl radical having from 1 to 7 carbon atoms, preferably from 1 to 3 carbon atoms, or a cycloalkyl radical having from 4 to 6 carbon atoms,
$R_3$ is an —O—C(=O)—$R_4$ group, a halogen or an —$OR_4$ group, where $R_4$ is a methoxyethyl group or an optionally branched alkyl radical having from 1 to 7 carbon atoms, preferably from 1 to 3 carbon atoms, or a cycloalkyl radical having from 4 to 6 carbon atoms,
and
m is the integer 1 or 2.

As an aminosilane having at least one hydrolyzable silane group, preference is given to using at least one compound selected from the group consisting of
3-(N-allylamino)propyltrimethoxysilane, 4-aminobutyltriethoxysilane, 1-amino-2-(dimethylethoxysilyl)propane,
N-(2-aminoethyl)-3-aminoisobutyldimethylmethoxysilane,
N-(2-aminoethyl)-3-aminoisobutylmethyldimethoxysilane,
(aminoethylaminomethyl)phenethyltrimethoxysilane,
N-(2-aminoethyl)-3-aminopropylmethyldimethoxysilane,
N-(2-aminoethyl)-3-aminopropyltriethoxysilane,
N-(2-aminoethyl)-3-aminopropyltrimethoxysilane,
N-(6-aminohexyl)aminomethyltrimethoxysilane,
N-(6-aminohexyl)aminopropyltrimethoxysilane,
N-(2-aminoethyl)-11-aminondecyltrimethoxysilane,
3-(m-aminophenoxy)propyltrimethoxysilane, m-aminophenyltrimethoxysilane, p-aminophenyltrimethoxysilane,
N-3-[amino(polypropylenoxy)]aminopropyltrimethoxysilane, 3-aminopropyldiisopropylethoxysilane, 3-aminopropyldimethylethoxysilane,
3-aminopropylmethyldiethoxysilane, 3-aminopropyltriethoxysilane,
3-aminopropyltrimethoxysilane, 11-aminoundecyltriethoxysilane,
3-aminopropyltricyclohexoxysilane, 3-aminopropyldicyclohexoxymethylsilane,
3-aminopropyldicyclohexoxyethylsilane,
N-methylaminopropyltricyclohexoxysilane,
N-phenylaminopropyltricyclohexoxysilane,
N-methylaminopropylmethyldicyclohexoxysilane,
N-phenylaminopropylmethyldicyclohexoxysilane,
bis(2-hydroxyethyl)-3-aminopropyltriethoxysilane,
bis(methyldiethoxysilylpropyl)amine,
bis(triethoxysilylpropyl)amine,
bis(trimethoxysilylpropyl)amine,
bis[(3-trimethoxysilyl)propyl]ethylenediamine,
bis(3-trimethoxysilylpropyl)-N-methylamine,
n-butyl-3-aminopropyltrimethoxysilane,
t-butyl-3-aminopropyltrimethoxysilane,
3-(2,4-dinitrophenylamino)propyltriethoxysilane,
N-ethylaminoisobutylmethyldiethoxysilane,
N-ethylaminoisobutyltrimethoxysilane,
N-(3-methacryloxy-2-hydroxypropyl)-3-aminopropyltriethoxysilane,
N-methylaminopropylmethyldimethoxysilane,
N-methylaminopropyltrimethoxysilane, N-phenylaminomethyltriethoxysilane,
N-phenylaminomethyltrimethoxysilane,
N-cyclohexyl-3-aminopropyltrimethoxysilane,
3-(N-styrylmethyl-2-aminoethylamino)propyltrimethoxysilane,
(3-trimethoxysilylpropyl)diethylenetriamine,
(3-triethoxysilylpropyl)diethylenetriamine,
N-cyclohexylaminomethylmethyldiethoxysilane,
N-cyclohexylaminomethyltriethoxysilane,
N-phenylaminomethyltriethoxysilane, 3-aminopropyldimethoxymethylsilane,
4-amino-3,3-dimethylbutyldimethoxymethylsilane,
4-amino-3,3-dimethylbutyldimethoxymethylsilane and mixtures thereof.

As a thiosilane having at least one hydrolyzable silane group, it is possible to use at least one compound selected from the group consisting of mercaptomethylmethyldiethoxysilane, 3-mercaptopropylmethyldimethoxysilane, 3-mercaptopropyltriethoxysilane, 3-mercaptopropyltrimethoxysilane and mixtures thereof.

As an isocyanatosilane having at least one hydrolyzable silane group, it is possible to use at least one compound selected from the group consisting of 3-isocyanatopropyldimethylchlorosilane, 3-isocyanatopropyltriethoxysilane, 3-isocyanatopropyltrimethoxysilane, (isocyanatomethyl)methyldimethoxysilane and mixtures thereof.

As an acid anhydride-functional silane having at least one hydrolyzable silane group, it is possible to use at least one compound selected from the group consisting of 3-(triethoxysilyl)propylsuccinic anhydride, 3-(trimethoxysilyl)propylsuccinic anhydride, 3-(triethoxysilyl)propylmaleic anhydride, 3-(trimethoxysilyl)propylmaleic anhydride and mixtures thereof.

As a (meth)acrylsilane having at least one hydrolyzable silane group, it is possible to use at least one compound selected from the group consisting of 3-(meth)acryloxypropyltrimethoxysilane, 3-(meth)acryloxypropylmethyldimethoxysilane, 3-(meth)acryloxypropyltriethoxysilane, 3-(meth)acryloxypropylmethyldiethoxysilane and mixtures thereof.

Furthermore, as an epoxysilane compound having at least hydrolyzable silane group, it is possible to use a compound selected from the group consisting of 2-(3,4-(epoxy)cyclohexyl)ethyltriethoxysilane, 2-(3,4-(epoxy)cyclohexyl)ethyltrimethoxysilane, 5,6-(epoxy)hexyltriethoxysilane, 5,6-(epoxy)hexyltrimethoxysilane, 5,6-(epoxy)hexylmethyldimethoxysilane, 5,6-(epoxy)hexylmethyldiethoxysilane, 5,6-(epoxy)hexyldimethylethoxysilane, 5,6-(epoxy)hexyldimethylmethoxysilane, (3-glycidoxypropyl)dimethylethoxysilane, (3-glycidoxypropyl)dimethylmethoxysilane, (3-glycidoxypropyl)methyldiethoxysilane, (3-glycidoxypropyl)methyldimethoxysilane, (3-glycidoxypropyl)triethoxysilane, (3-glycidoxypropyl)trimethoxysilane and mixtures thereof.

As amines which do not contain a hydrolyzable silane group and are optionally used in the preparation of the coupling additive I a) and necessarily in the preparation of the coupling additive I b), it is in principle possible to use all compounds which have at least one primary or secondary amino group, preferably at least one primary amino group.

Preferred amines are aliphatic amines, preferably aliphatic amines having from 1 to 20 carbon atoms, which may optionally be substituted by hydroxy groups and/or alkoxy groups, cycloaliphatic amines having from 4 to 20 carbon atoms, which may optionally be substituted by hydroxy groups and/or alkoxy groups, aromatic amines having from 6 to 24 carbon atoms, which may optionally be substituted by hydroxy groups and/or alkoxy groups.

Such preferred amines are monomethylamine, monoethylamine, n-propylamine, isopropylamine, butylamine, n-pentylamine, t-butylamine, hexylamine, octylamine, 2-ethylhexylamine, dodecylamine, tridecylamine, oleylamine, dimethylamine, diethylamine, dipropylamine, dibutylamine, dihexylamine, bis(2-ethylhexyl)amine, bis(tridecyl)amine, 3-methoxypropylamine, 2-ethoxyethylamine, 3-ethoxypropylamine, 3-(2-ethylhexyloxy)propylamine, cyclopentylamine, cyclohexylamine, 1-phenylethylamine, dicyclohexylamine, benzylamine, N-methylbenzylamine, N-ethylbenzylamine, 2-phenylethylamine, aniline, o-toluidine, 2,6-xylidine, 1,2-phenylenediamine, 1,3-phenylenediamine, 1,4-phenylenediamine, o-xylylenediamine, m-xylylenediamine, p-xylylenediamine, ethylenediamine, 1,3-propanediamine, 1,2-propanediamine, 1,4-butanediamine, 1,2-butanediamine, 1,3-butanediamine, neopentanediamine, hexamethylenediamine, octamethylenediamine, isophoronediamine, 4,4'-diaminodicyclohexylmethane, 3,3'-dimethyl-4,4'-diaminodicyclohexylmethane, 4,4'-diaminodiphenylmethane, 4,9-dioxyadodecane-1,12-diamine, 4,7,10-trioxatridecane-1,13-diamine, 3-(methylamino)propylamine, 3-(cyclohexylamino)propylamine, 3-(diethylamino)ethylamine, 3-(dimethylamino)propylamine, 3-(diethylamino)propylamine, diethylenetriamine, triethylenetetramine, tetraethylenepentamine, 3-(2-aminoethyl)aminopropylamine, dipropylenetriamine, N,N-bis(3-aminopropyl)methylamine, N,N'-bis(3-aminopropyl)ethylenediamine, bis(3-dimethylaminopropyl)amine, N-(3-aminopropyl)imidazole, monoethanolamine, 3-amino-1-propanol, isopropanolamine, 5-amino-1-pentanol, 2-(2-aminoethoxy)ethanol, aminoethylethanolamine, N-(2-hydroxyethyl)-1,3-propanediamine, N-methylethanolamine, N-ethylethanolamine, N-butylethanolamine, diethanolamine, 3-((2-hydroxyethyl)amino)-1-propanol, diisopropanolamine, N-(2-hydroxyethyl)aniline, 1-methyl-3-phenylpropylamine, furfurylamine, N-isopropylbenzylamine, 1-(1-naphthyl)ethylamine, N-benzylethanolamine, 2-(4-methoxyphenyl)ethylamine, N,N-dimethylaminoethylamine, ethoxypropylamine, 2-methoxyethylamine, 2-ethoxyethylamine, 2-cyclohexenylethylamine, piperidine, diethylaminopropylamine, 4-methylcyclohexylamine, hydroxynovaldiamine, 3-(2-ethylhexyloxy)propylamine, tris(2-aminoethyl)amine, N,N'-di-tert-butylethylenediamine, tris(hydroxymethyl)aminomethane.

Furthermore, it is possible to use amino-terminated polyethers in which the polyether is based on an alkylene oxide, preferably ethylene oxide and/or propylene oxide and/or, if appropriate, further epoxides (e.g. butylene oxide, styrene oxide) or tetrahydrofuran and which are functionalized with amino groups.

The compounds can, depending on the structure, bear one, two or more than two amino groups. Such products are, for example, marketed by Huntsman under the name "Jeffamine" or by BASF as "Polyetheramin" and bear, for example, the designations M-600, M-1000, M-2005, M-2070, D-230, D-400, D-2000, D-4000, T-403, T-3000, T-5000, Polytetrafuranamine 1700, ED-600, ED-900, ED-2003, HK-511, EDR-148, EDR-176, SD-231, SD-401, SD-2001, ST-404.

Furthermore, dentritic polyimine structures such as preferably polyethylenimines and/or polypropylenimines, particularly preferably polyethylenimines, can be used as amines. These polyimines can optionally also be modified by partial alkoxylation of the amino functions.

Suitable reaction partners for the compounds having at least one hydrolyzable silane group to prepare the addition products I a) to e) are at least oligomeric, preferably polymeric compounds. These oligomeric or polymeric compounds having functional end groups are preferably polydisperse. i.e. they do not have a uniform chain length, and are also used in polydisperse form for the addition reaction with the silane compounds mentioned.

These polydisperse, at least oligomeric compounds are preferably reacted with molecularly uniform (i.e. monodisperse), organic compounds containing hydrolyzable silane groups by means of addition reactions.

This reaction to prepare the coupling additives is based, in the case of addition product I a), on the addition onto preferably at least oligomeric compounds which have terminal ethylenically unsaturated double bonds, where these terminal double bonds are acrylate and/or methacrylate groups, preferably acrylate groups. At least one aminosilane and optionally thiosilane having at least one hydrolyzable silane group is added onto the at least oligomeric compound. In the addition reaction, preference is given to reacting from 5 to 95 mol %, particularly preferably from 10 to 90 mol %, very particularly preferably from 15 to 80 mol %, of the double bonds with the aminosilanes and optionally thiosilanes. If appropriate, preferably the remaining from 95 to 5 mol %, particularly preferably from 90 to 10 mol %, very particularly preferably from 85 to 20 mol %, of the double bonds can be reacted with a further amine component which does not contain any silane groups.

The coupling additive I b) is preferably prepared by addition onto preferably at least oligomeric compounds which have at least one terminal hydroxy group and at least one terminal, ethylenically unsaturated double bond. These terminal double bonds are acrylate and/or methacrylate groups, preferably acrylate groups. An isocyanatosilane and/or epoxysilane having at least one hydrolyzable silane group and also at least one further amine which is not silane-functional are added onto the oligomeric compound.

The reaction is preferably carried out in two steps, with the isocyanaosilane and/or epoxysilane first being added onto the hydroxy groups of the at least oligomeric compound and the terminal double bonds then being reacted with a monoamine or polyamine which is not silane-functional.

Here, the hydroxyl groups are reacted with epoxysilanes and/or an isocyanatosilane to an extent of preferably more than 80 mol %, particularly preferably more than 90 mol %, very particularly preferably more than 95 mol %, and the double bonds are reacted with a monoamine or polyamine which is not silane-functional to an extent of more than 80 mol %, particularly preferably more than 90 mol %, very particularly preferably more than 95 mol %.

To prepare the addition product I c), an addition onto preferably at least oligomeric compounds which contain at least two terminal amino groups is carried out. These amino groups are preferably primary and/or secondary amino groups, particularly preferably primary amino groups. At least one (meth)acrylsilane or acid anhydride-functional silane having at least one hydrolyzable silane group is added onto the oligomeric compound. In this addition reaction, preference is given to reacting from 5 to 95 mol %, particularly preferably from 10 to 90 mol %, very particularly preferably from 15 to 80 mol %, of the amino groups with the (meth)acrylsilanes or acid anhydride-functional silanes.

Correspondingly, preferably from 95 to 5 mol %, particularly preferably from 90 to 10 mol %, very particularly preferably from 85 to 20 mol %, of the amino groups can be present in unchanged form. They can be left in this form or optionally be modified by means of a further reaction known to those skilled in the art.

To prepare the addition product I d), an addition onto preferably at least oligomeric compounds which have at least two terminal amino groups is preferably carried out.

The amino groups are preferably primary and/or secondary amino groups, particularly preferably primary amino groups. At least one isocyanatosilane and/or epoxysilane having a least one hydrolyzable silane group and optionally at least one further monoisocyanate and/or an epoxide compound are added onto the oligomeric compound. In this addition reaction, preference is given to reacting from 5 to 95 mol %, particularly preferably from 10 to 90 mol %, very particularly preferably from 15 to 80 mol %, of the amino groups with the isocyanatosilanes and/or epoxysilanes. Correspondingly, preferably from 95 to 5 mol %, particularly preferably from 90 to 10 mol %, very particularly preferably from 85 to 20 mol %, of the amino groups are present in unreacted form. These can be left as such or optionally be reacted further with an isocyanate or epoxide which is not silane-functional and can optionally be used.

To prepare the addition product I (e), an addition onto preferably at least oligomeric compounds which have at least two terminal epoxy groups is preferably carried out. At least one aminosilane and/or thiosilane having at least one hydrolyzable silane group are added onto the oligomeric compound. In this addition reaction, preference is given to reacting from 5 to 95 mol %, particularly preferably from 10 to 90 mol %, very particularly preferably from 15 to 80 mol %, of the amino groups with aminosilanes. Correspondingly, preferably from 95 to 5 mol %, particularly preferably from 90 to 10 mol %, very particularly preferably from 85 to 20 mol %, of the epoxy groups are present in unreacted form. They can be left as such or optionally be modified by means of a reaction known to those skilled in the art.

The appropriate reaction conditions to be adhered to in each case in the addition reactions to prepare the coupling additives I a)-e) are known to those skilled in the art.

The compounds having terminal ethylenically unsaturated double bonds, hydroxy groups, epoxide groups and/or amino groups are preferably oligomeric compounds having at least 2 recurring structural units, particularly preferably polymeric compounds having at least 4 recurring structural units. Preference is given to at least one polymeric compound selected from the group consisting of polyethers, polyesters, polyester polyethers, polyamides, polyesteramides which have appropriately modified end groups. According to the invention, polycarbonates are included among polyesters.

Suitable polyethers are compounds having the recurring structural unit

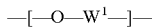

where $W^1$ is an aliphatic radical having from 1 to 15 carbon atoms, preferably from 2 to 8 carbon atoms, particularly preferably from 2 to 4 carbon atoms, an aromatic or cycloaliphatic ring or an aromatic-aliphatic group. The ether group can also be part of a ring attached to the chain.

Preferred polyethers are polyethylene oxides, polypropylene oxides, poly(trimethylene) oxides, polybutylene oxides, polystyrene oxides, ethylene oxide-propylene oxide copolyethers, poly(tetrahydrofurans) which may have bisphenol A units in the main chain, copolymers composed of structural units of the abovementioned polyethers or mixtures of at least two of the abovementioned polyethers. Furthermore, it is also possible to use polyethers which are derived from glycidyl ethers and are obtained by reacting bisphenols with epichlorohydrin. Particularly preferred end group-modified polyethers are derived from polyethylene oxides, polypropylene oxides and polyethers of ethylene oxide-propylene oxide. The polyethers preferably have a molecular weight of from 100 to 10 000 g/mol, particularly preferably from 150 to 7500 g/mol, very particularly preferably from 200 to 3000 g/mol.

Suitable end group-modified polyesters are preferably appropriately modified, saturated polyesters, i.e. polyesters which are not ethylenically unsaturated, for example polyesters of lactones such as ε-caprolactone and/or δ-valerolactone and also polyesters which have been obtained by condensation of α,ω-hydroxycarboxylic acids or by condensation of dicarboxylic acids with diols. As acid components, it is possible to use either dicarboxylic acids, their acid halides, acid anhydrides or esters; the following dicarboxylic acids are particularly suitable: oxalic acid, malonic acid, dimethylmalonic acid, succinic acid, glutaric acid, adipic acid, trimethyladipic acid, pimelic acid, 2,2-dimethylglutaric acid, azelaic acid, sebacic acid, 1,3-cyclopentane-dicarboxylic acid, 1,2-cyclohexanedicarboxylic acid, 1,4-cyclohexanedicarboxylic acid, phthalic acid, terephthalic acid, isophthalic acid, 2,5-norbornanedicarboxylic acid, 1,4-naphthalenedicarboxylic acid, diphenic acid, 4,4'-oxydibenzoic acid, diglycolic acid, thiodipropionic acid. 4,4'-sulfonyldibenzoic acid, 2,5-naphthalenedicarboxylic acid, tricyclodecanedicarboxylic acid.

Suitable diols for reaction with the saturated dicarboxylic acids are preferably ethanediol, 1,2-propanediol, 1,3-propanediol, 1,2-butanediol, 1,4-butanediol, 1,2-pentanediol, 1,4-pentanediol, 2,4-pentanediol, 1,2-hexanediol, 1,5-hexanediol, 1,6-hexanediol, 2,5-hexanediol, 1,7-heptanediol, 1,8-octanediol, neopentyl glycol.

Polyesters which are particularly preferably used are poly(ε-caprolactone), poly(δ-valerolactone), caprolactone/valerolactone copolyesters, polylactide, polyethylene terephthalate and polybutylene terephthalate.

End group-modified polyesters also include polycarbonates having the recurring structural unit

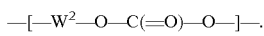

Here, $W^2$ is an aliphatic radical having from 2 to 15 carbon atoms, preferably from 2 to 12 carbon atoms, particularly preferably from 2 to 8 carbon atoms, or an aromatic or cycloaliphatic radical or an aromatic-aliphatic group, preferably a bisphenol A radical or a radical derived therefrom. The carbonate group can also be part of a ring attached to the chain.

Mixed polyesters of carbonic acid and other acids (polyester polycarbonates) are also suitable. Preferred polycarbonates are bisphenol A polycarbonate, bisphenol F polycarbonate, bisphenol AF polycarbonate, polycarbonates based on bisphenol A and bisphenol TMC and also those based on 1,6-hexanediol. According to the invention, the term polyester also includes polycarbonates or copolyester carbonates.

Preferred polyesters are polyesters having a molecular weight of from 150 to 15 000 g/mol, particularly preferably from 200 to 7500 g/mol, very particularly preferably from 250 to 3000 g/mol.

End group-modified polyamides having the recurring structural unit

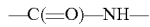

can also be used for preparing the coupling additives. Typical possible building blocks for polyamides are: c-caprolactam, aminocaproic acid, enatholactam, 7-aminoheptanoic acid, 11-aminoundecanoic acid, 9-aminononanoic acid or mixtures thereof. If the polyamide is prepared by polycondensation of a diamine and a dicarboxylic acid, preferred diamines are tetramethylenediamine, hexamethylenediamine, nonamethylenediamine, decamethylenediamine, undecamethylenediamine, dodecamethylenediamine, para-aminoaniline or meta-xylenediamine, and preferred dicarboxylic acids are adipic acid, sebacic acid, dodecanedioic acid, glutaric acid, terephthalic acid, 2-methylterephthalic acid, isophthalic acid, dimer acid and naphthalenedicarboxylic acid.

In addition to diacids or diamines, it is also possible to use polyfunctional compounds such as trimellitic acid and pyromellitic acid, which have 3 or more functional groups, in amounts of up to 5 mol %.

Preferred polyamides are those having a molecular weight of from 150 to 15 000 g/mol, particularly preferably from 200 to 7500 g/mol, very particularly preferably from 250 to 3000 g/mol.

Polyamides which are particularly preferably used are derived from nylon 6, nylon 7, nylon 8, nylon 10, nylon 2, nylon 66, nylon 69, nylon 610, nylon 611, nylon 612, nylon 6T, nylon 6/66, nylon 6/12, nylon 6/6T.

It is also possible to use end group-modified polyesteramides having the abovementioned structural units.

The polymers mentioned can have a linear, branched or star-like structure. Branched or star-like polymers can be obtained using suitable multifunctional starting compounds.

Particularly preferred oligomeric or polymeric compounds are polyethylene oxides, polypropylene oxides, polyethers of ethylene oxide-propylene oxide and also poly(ε-caprolactone) esters.

The abovementioned oligomeric or polymeric compounds having modified end groups are preferably polydisperse, i.e. they do not have a uniform chain length, and are also used in polydisperse form for reaction with the silane compounds mentioned.

The curable polymer mixtures of the invention, preferably polymer concrete mixtures, preferably contain less than 5% by weight, particularly preferably less than 1% by weight, very particularly preferably less than 0.5% by weight, based on the total weight of the polymer mixture, of at least one of the above-described coupling additives I a)-e).

As binder component II of the curable polymer mixtures of the invention, preference is given to using a curable system comprising at least one polymer having at least two epoxide end groups together with at least one hardener and optionally at least one additional cocrosslinking component.

The polymer is at least partially curable by reaction of its epoxide groups with the amino groups of at least one of the coupling additives I a)-d) and/or the epoxide groups of the coupling additive I e).

The corresponding process is described in relevant monographs, for example in J. Möckel, U. Fuhrmann, Epoxidharze—Schlüsselwerkstoffe für die moderne Technik, Verlag Moderne Industrie, Landsberg/Lech 1996; W. G. Potter, Use of Epoxy Resins, Newnes Butterworth, Sevenoaks 1975; H. Lee, K. Neville, Handbook of Epoxy Resins, McGraw-Hill, New York 1982; C. A. May, Epoxy Resins—Chemistry and Technology, Dekker, New York 1988; B. Ellis, Chemistry and Technology of Epoxy Resins, Blackie Academic & Professional, London 1993; N. Kinjo, M. Ogata, K. Nishi, A. Kaneda, Epoxy Molding Compounds as Encapsulation Materials for Microelectronic Devices, in: Advances in Polymer Science 1989, Vol. 88, pp. 1-48; and also the references cited in these literature references. The corresponding description is hereby incorporated by reference as part of the disclosure of the present application.

As curable polymer, preference is given to using a polymer which has epoxide end groups and can particularly preferably be obtained by reaction of epichlorohydrin with polyhydric phenols, very particularly preferably by reaction with bisphenol A and/or bisphenol F, to form an epoxy resin, and also mixtures of the corresponding epoxy resins. To produce salt-extinguishing epoxy resins, it is also possible to use chlorinated and/or brominated derivatives. To improve the dielectric properties, the moisture absorption and dimensional stability, it is also possible to use resins which contain naphthalene-, stilbene-, aromatic ester-, biphenyl-, fluorene-, cycloaliphatic-or adamantine-based radicals, as are described in J. Appl. Polymer Sci. 2007, 106, 737 and references cited therein. Furthermore, the use of polymers obtained by reaction of aliphatic or alicyclic alcohols with epichlorohydrin is also possible.

Epoxy resin systems can also contain aliphatic, cycloaliphatic or aromatic compounds having one or more epoxide groups in order to achieve a reduced viscosity and/or increased flexibility; these act as reactive diluents or reactive flexibilizers and are referred to as such. Examples are butyl glycidyl ether, phenyl glycidyl ether, 1,4-butanediol diglycidyl ether, cresyl glycidyl ether, tert-butylphenyl glycidyl ether, polyglycerol triglycidyl ether, cyclohexanedimethanol diglycidyl ether, glycerol triglycidyl ether, neopentyl glycol diglycidyl ether, pentaerythritol tetraglycidyl ether, 2-ethylhexyl glycidyl ether, 1,6-hexanediol diglycidyl ether, polypropylene glycol diglycidyl ether, polyethylene glycol diglycidyl ether, trimethylolpropane triglycidyl ether, alkyl glycidyl ether, castor oil triglycidyl ether, but-2-ene-1,4-diol diglycidyl ether, diglycidyl tetrahydrophthalate, diglycidyl hexahydrophthalate, glycidyl neodecanoate, perhydrobisphenol A diglycidyl ether, vinylcyclohexene diepoxide.

Hardeners are concomitantly used for the polymerization of the binder component II. Suitable hardeners are polyamines, carboxylic anhydrides, carboxylic acids, polyphenols, amino resins, phenolic resins, catalytically curing compounds (e.g. ferrocenes, triarylsulfonium compounds), preferably polyamines or carboxylic anhydrides as described in, for example, Stoye/Freitag, "Lackharze: Chemie, Eigenschaften and Anwendungen", Verlag Hanser Fachbuch, or in DE 10 2005 046 641 A1, or in the catalog "UPPC Lieferprogramm: Epoxidharzharter, Epoxidharze, Glycidether" from UPPC AG, 88487 Mietringen-Baltringen. The corresponding disclosure is hereby incorporated by reference into the present application.

It is also possible to use a halogenated compound as hardener component, and this then leads to formation of flame resistant moldings. Examples are chlorinated or brominated cyclic acid anhydrides.

Examples of hardener components having amino groups are aliphatic, cycloaliphatic, araliphatic bifunctional and/or polyfunctional amines. These include, inter alia, primary, aliphatic polyamines (e.g. ethylenediamine, diethylenetriamine, triethylenetetramine, tetraethylenepentamine, pentaethylenehexamine and homologues, 1,3-pentanediamine, propylenediamine, hexamethylenediamine, dipropylenetriamine, polyoxyethylenepolyamines, polyoxypropylenepolyamines, polytetrahydrofuranpolyamines, modified aliphatic amines (for example Mannich bases or amines produced by reaction of primary amines with glycidyl ethers or carboxylic acids, preferably fatty acids), hydroxylated primary amines, cycloaliphatic amines such as isophoronediamine, diaminocyclohexane, N-aminoethylpiperazine, tricyclodecanetriamine, aromatic polyamines such as phenylenediamines, methylenedianiline, diaminodiphenylmethane, bis(aminophenyl) sulfone, araliphatic amines such as xylylenediamine.

For example, carboxylic anhydrides such as orthophthalic anhydride, hexahydrophthalic anhydride, methyltetrahydrophthalic anhydride can also be used as hardeners.

Depending on the curing conditions, a conventional accelerator can optionally be concomitantly used so that the reaction and curing of the binder component II can occur at lower temperatures and/or with a considerably shorter curing time. Customary accelerators are phenolic compounds or tertiary amines, e.g. triethylamine, tridimethylaminomethylphenol, dimethylaminomethylphenol, diethylenetriaminomethylphenol, benzyldimethylamine, dimethylaniline, diethylaniline, dimethyl-p-toluidines. They are preferably used in combination with carboxylic anhydride hardeners.

Curing of epoxy resins of the binder component II can optionally also be carried out in combination with isocyanate resins, optionally also with blocked isocyanates.

Typical epoxy resins, hardeners and accelerators and also their use conditions, optionally in combined use with other additives, are described in the relevant literature, for example in Stoye/Freitag, "Lackharze: Chemie, Eigenschaften and Anwendungen", Verlag Hanser Fachbuch, or in "Technische Information: Oberflächenschutz", volumes 1 and 2, published by Witco GmbH, Bergkamen and the references listed therein. The corresponding disclosure is hereby incorporated by reference as part of the disclosure of the present application.

Depending on the hardener system, it can also be preferable to carry out curing at elevated temperature. A person skilled in the art will know what temperature range should be chosen as a function of the respective hardener, with the temperature being able to vary within a wide range, so that, for example, curing is possible at from 50° C. to 150° C. An external input of energy can be effected in various ways, for example, inter alia, by heating in an oven or by means of suitable irradiation, in each case optionally in combination with application of pressure.

The amounts of a hardener and any accelerator system present which are used in each case are known to those skilled in the art.

In addition, the curable polymer mixture, preferably polymer concrete mixture, of the invention is provided with at least 20% by weight, preferably at least 40% by weight, particularly preferably 60% by weight, in particular up to 95% by weight, based on the total weight of the polymer mixture, of inorganic fillers in any form as aggregates. These fillers can, if appropriate, be distributed in the matrix materials when they are multiparticulate or fibrous and do not dissolve therein. A listing of possible fillers is given in E. Brandau, "Duroplastwerkstoffe", VCH Verlagsgesellschaft, Weinheim 1993 and in R. Burns, "Polyester Molding Compounds", Marcel Dekker Inc., New York 1982 and also in J. H. Aurer, A. Kasper, "Unsaturated Polyester Resins", Verlag Moderne Industrie, Landsberg/Lech 2003. As optionally dispersible inorganic fillers, preference is given to using inorganic, silicon-containing compounds, for example quartz, crystobalite, pyrogenic silicas, precipitated silicas, wollastonite, kaolin, mica, borosilicates, barium aluminosilicates, glass powders, titanium silicates, zirconium silicates, montmorillonite, talc, preferably as rock particle fractions in all particle size ranges, i.e. from the very fine particle range to a coarse rock particle size, silicon-containing compounds in any form, preferably as loose or bound, cut or continuous fibers, e.g. lay-ups or woven fabrics, and also other oxygen-containing inorganic compounds of magnesium, calcium, barium, e.g. barium sulfate, calcium carbonate, inter alia also as marble particles, gypsum, magnesium hydroxide and/or inorganic aluminum compounds, preferably aluminum hydroxide, aluminum oxides (e.g. α-alumina) and aluminum oxide hydroxides. Particular preference is given to using silicon-containing compounds.

Particularly preferred forms of the fillers are particulate or pulverulent fillers or lay-ups or woven fabrics composed of fibers, optionally mixtures of the two forms of fillers. The particle size ranges are preferably from 1 μm to 5 cm, particularly preferably from 10 μm to 2 cm, very particularly preferably from 100 μm to 2 cm, measured as diameter.

As mentioned above, the fillers in the polymer mixtures of the invention are, in particular, present as oxidic silicon compounds, optionally as continuous structures, e.g. in fiber form, with the fibers also being able to be present in the form of strands, matts, woven fabrics and/or lay-ups. If appropriate, the abovementioned fillers can be concomitantly used in multiparticulate forms.

In addition, the curable polymer mixture of the invention can, if necessary, contain, as auxiliaries IV), processing additives such as release agents and antifoams, deaerators, inhibitors, stabilizers such as antioxidants, light stabilizers, heat stabilizers and flame retardants, modifiers such as wetting agents, plasticizers, thickeners, thixotropes, impact modifiers and additives to reduce the brittleness (known as "tougheners", cf. Polymer 2000, 41, 3425 and Macromolecules 1999, 32, 8524), blowing agents and/or surface modifiers such as antistatics, hydrophobicizing agents, hydrophilicizing agents, additives to improve biodegradability (cf. Journal of Applied Polymer Science 2007, 106, 684), pigments, wetting agents and dispersants. The choice of the appropriate additives is made in a known manner according to the ultimate use.

The polymer mixtures of the invention, preferably polymer concrete mixtures, are produced in a known way by combining the abovementioned components of the mixture in conventional mixing units, with the coupling additive I preferably being added immediately before processing and curing of the polymer mixture or the filler being treated with at least part of the coupling additive I and then being combined with the further components of the polymer concrete mixture.

The use of at least one of the coupling additives I a)-e) as described above which are used according to the invention and the abovementioned binder system II not only makes it possible to provide polymer mixtures, preferably polymer concrete mixtures, which display better handling because of their lower viscosity but also to produce polymer products such as polymer moldings or polymer concretes of any shape which display excellent mechanical properties and lead to low environmental pollution and risk to health.

The present invention therefore further provides for the use of the above-described addition products I a)-I e) as coupling additive I in curable polymer mixtures, preferably polymer concrete mixtures, which are based on a system which can be cured by reaction of epoxide groups with amino groups as binder component II and are preferably provided with at least 20% by weight, particularly preferably at least 40% by weight, very particularly preferably at least 60% by weight, based on the total weight of the polymer mixture, of optionally dispersible, inorganic fillers as aggregates III and may contain conventional auxiliaries IV.

The present invention further provides for the use of at least one addition product I a)-I e) as coupling additive I in curable polymer mixtures, preferably polymer concrete mixtures, which are based on a system which can be cured by reaction of epoxide groups and amino groups as binder II and are provided with preferably 20% by weight, particularly preferably at least 30% by weight, very particularly preferably at least 50% by weight, based on the total weight of the polymer mixture, of continuous, fibrous, inorganic fillers as aggregates III, and optionally conventional auxiliaries IV.

These polymer mixtures obtained in this way can be cured in a manner known per se as described in G. Kannebley et al., "AVK-TV Handbuch", volumes I and II, Frankfurt 2004 and Stoye/Freitag, "Lackharze: Chemie, Eigenschaften and Anwendungen", Verlag Hanser Fachbuch and in J. Möckel/U. Fuhrmann, "Epoxidharze—Schlüsselwerkstoffe für die moderne Technik", Bibiliothek der Technik, volume 51, Verlag Moderne Industrie, Landsberg/Lech 1996.

The corresponding description is hereby incorporated by reference into the disclosure of the present patent application.

The curing process is determined by the polymer system used, the reactivity of the hardener, the optional concomitant use of an accelerator, the curing time, the temperature and the mass of the system to be cured. Curing can occur without introduction of thermal energy at room temperature as start temperature or, as described above, at elevated temperature.

Polymer moldings or polymer concretes of any shape can preferably be produced from the polymer mixtures of the invention, preferably polymer concrete mixtures, and can be used, for example, in building and construction, in pipeline construction, apparatus construction, tool making, weapons technology, shipbuilding, railcar construction, automobile construction or in aerospace applications. Specific examples are shaped bodies such as pipes, gutters, shafts, connecting pieces, segment components, plates, tiles, floors, floor coverings, linings, walls, ceilings, artificial marble, frames, various containers, e.g. for feed water and wastewater), decorative articles, sinks, basins, tanks, troughs, other containers. Further fields of use are the production of concrete coatings, concrete renovation, corrosion protection, electrical technology, electronics. The polymer mixtures of the invention, preferably polymer concrete mixtures, can be used both in buildings and in the open and also underground for producing polymer concrete bodies, preferably polymer concrete moldings. Such moldings are used, for example, in living areas, in the office sector, in shop construction, in the sanitary sector, in kitchens, in hairdressing salons, in medical practices, in hospitals, in airports, in wind turbines, in laboratories, in gastronomy or in agriculture. The curable polymer mixtures described can also be used in applications in the fields of electronics, electrical technology, adhesives, composites, embedding compositions, manufacturing means and tools. Thus, use in, for example, the field of encapsulation of microelectronic components and in the coating and lamination of printed circuit boards is also possible.

EXAMPLES

In the examples, the following polymers are used:

| Name | Description of the oligomer or polymer |
|---|---|
| Diamine A | bifunctional NH$_2$-terminated polypropylene glycol having a molecular weight of about 430 (on average 6.1 units of propylene oxide) |
| Diamine B | bifunctional NH$_2$-terminated polyether having a molecular weight of about 600 (on average 9 units of ethylene oxide and 3.6 units of propylene oxide) |
| Triamine C | trimethylolpropane-initiated trifunctional NH$_2$-terminated polypropylene glycol (on average 5-6 units of propylene oxide) |
| Diacrylate D | polyethylene glycol 200 diacrylate |
| Monoacrylate E | OH-terminated polyester monoacrylate (polyester based on ε-caprolactone, M$_n$ = 590, PDI = 1.35) |
| Diepoxide F | polypropylene glycol diglycidyl ether having 4-6 units of propylene glycol |
| Diacrylate G | diacrylate of ethoxylated bisphenol A having 4 units of ethylene oxide |

I Preparation of the Coupling Additives

The preparation of the coupling additives can, if appropriate, be carried out in an organic solvent. In the following description, the abbreviation GPC refers to gel permeation chromatography, NMR is nuclear magnetic resonance spectroscopy, M$_n$ is the number average molecular weight, PDI is the polydispersity index (i.e. the ratio M$_w$/M$_n$ of weight average and number average molecular weight). Dowanol PMA is 1-methoxy-2-propyl acetate.

Coupling Additive 1:

20.00 g of the polymeric diamine A and 9.55 g of 3-isocyanatopropyltrimethoxysilane are stirred at room temperature in a closable screw-cap bottle by means of a magnetic stirrer bar for 3 hours. Product: the isocyanate groups were reacted completely (determined by $^{13}$C-NMR spectroscopy).

Coupling Additive 2:

23.15 g of aminoethylethanolamine, 71.80 g of Dowanol PMA and 24.60 g of 3-aminopropyltriethoxysilane are placed in a round-bottom flask provided with reflux condenser, gas inlet, temperature sensor, dropping funnel and precision glass stirrer. The reaction is carried out under a stream of nitrogen. 60.00 g of the polymeric diacrylate D (M$_n$=400, PDI=1.12) are added dropwise over a period of 20 minutes, with the temperature not exceeding 28° C. The mixture is stirred for 6 hours. Product: M$_n$=670, PDI=1.72, acrylate groups no longer detectable (by means of $^1$H-NMR spectroscopy). The coupling additive obtained is a 60% strength solution of the active substance in Dowanol PMA.

Coupling Additive 3:

50.00 g of the polymeric triamine C are placed in a round-bottom flask provided with reflux condenser, gas inlet, temperature sensor, dropping funnel and precision glass stirrer. The reaction is carried out under a stream of nitrogen. The reaction mixture is heated to 85° C. 43.8 g of 3-glycidyloxypropyltriethoxysilane are added dropwise over a period of 15 minutes. The mixture is stirred at 85° C. for another 4 hours, after which the ratio of silane groups to epoxy groups is 1:0.08 (determined by means of 1H-NMR spectroscopy), i.e. 92% of the epoxide groups have been reacted. After a further 4 hours at 85° C., the epoxy groups are reacted completely, so that their resonance signal relative to that of the silane groups can no longer be integrated.

Coupling Additive 4:

60.00 g of the polymeric diacrylate D (M$_n$=400, PDI=1.12) and 72.00 g of Dowanol PMA are placed in a round-bottom flask provided with reflux condenser, gas inlet, temperature sensor, dropping funnel and precision glass stirrer. The reaction is carried out under a stream of nitrogen. 24.60 g of 3-aminopropyltriethoxysilane are added dropwise over a period of 15 minutes. 23.15 g of aminoethylethanolamine are subsequently added dropwise over a period of 15 minutes, with the temperature not exceeding 38° C. The mixture is stirred for 6 hours. Product: M$_n$=630, PDI=1.73, acrylate groups no longer detectable (by means of $^1$H-NMR spectroscopy). The coupling additive obtained is a 60% strength solution of the active substance in Dowanol PMA.

Coupling Additive 5:

24.49 g of 3-methylaminopropylamine and 49.20 g of 3-aminopropyltriethoxysilane are placed in a round-bottom flask provided with reflux condenser, gas inlet, temperature sensor, dropping funnel and precision glass stirrer. The reaction is carried out under a stream of nitrogen. 90.00 g of the polymeric diacrylate D are added dropwise over a period of 45 minutes, with the temperature not exceeding 30° C. The mixture is stirred for a further 7 hours. Product: M$_n$=730, PDI=1.85, the acrylate groups were reacted completely (determined by means of $^1$H-NMR spectroscopy).

Coupling Additive 6:

12.24 g of 3-methylaminopropylamine, 122.77 g of Dowanol PMA and 24.60 g of 3-aminopropyltriethoxysilane are placed in a round-bottom flask provided with reflux condenser, gas inlet, temperature sensor, dropping funnel and precision glass stirrer. The reaction is carried out under a stream of nitrogen. 45.00 g of the polymeric diacrylate D are added dropwise over a period of 35 minutes, with the temperature not exceeding 28° C. The mixture is stirred for a further 8 hours. Product: M$_n$=540, PDI=1.58, the acrylate groups were reacted completely (determined by means of 1H-NMR spectroscopy). The coupling additive obtained is a 40% strength solution of the active substance in Dowanol PMA.

Coupling Additive 7:

3.53 g of 3-methylaminopropylamine, 100.38 g of Dowanol PMA and 30.99 g of 3-aminopropyltriethoxysilane are placed in a round-bottom flask provided with reflux condenser, gas inlet, temperature sensor, dropping funnel and precision glass stirrer. The reaction is carried out under a stream of nitrogen. 32.40 g of the polymeric diacrylate D are added dropwise over a period of 35 minutes, with the temperature not exceeding 45° C. The mixture is stirred for a further 6 hours. Product: M$_n$=1340, PDI=1.79, the acrylate groups were reacted completely (determined by means of $^1$H-NMR spectroscopy). The coupling additive is a 40% strength solution of the active substance in Dowanol PMA.

Coupling Additive 8:

11.70 g of 3-methylaminopropylamine, 74.20 g of Dowanol PMA and 29.50 g of 3-aminopropyltriethoxysilane are placed in a round-bottom flask provided with reflux condenser, gas inlet, temperature sensor, dropping funnel and precision glass stirrer and heated to 40° C. The reaction is carried out under a stream of nitrogen. 54.00 g of the polymeric diacrylate D are added dropwise over a period of 20 minutes, with the temperature not exceeding 42° C. The mixture is stirred for 30 minutes. 3.74 g of Lupasol G20 (water-free polyethylenimine from BASF having a molar mass of about 1300 g/mol) dissolved in 74.20 g of Dowanol PMA are subsequently added and the mixture is stirred for a further 6 hours. Product: $M_n$=910, PDI=1.84, the acrylate groups were reacted completely (determined by means of $^1$H-NMR spectroscopy). The coupling additive obtained is a 40% strength solution of the active substance in Dowanol PMA.

Coupling Additive 9:

12.25 g of 3-methylaminopropylamine, 115.76 g of Dowanol PMA and 19.92 g of 3-aminopropyltrimethoxysilane are placed in a round-bottom flask provided with reflux condenser, gas inlet, temperature sensor, dropping funnel and precision glass stirrer. The reaction is carried out under a stream of nitrogen. 45.00 g of the polymeric diacrylate D are added dropwise over a period of 10 minutes, with the temperature not exceeding 45° C. The mixture is stirred for a further 6 hours. Product: $M_n$=860, PDI=2.04, the acrylate groups were reacted completely (determined by means of $^1$H-NMR spectroscopy). The coupling additive obtained is a 40% strength solution of the active substance in Dowanol PMA.

Coupling Additive 10:

50.00 g of the polymeric diacrylate D and 120.00 g of Dowanol PMA are placed in a round-bottom flask provided with reflux condenser, gas inlet, temperature sensor, dropping funnel and precision glass stirrer and heated to 50° C. The reaction is carried out under a stream of nitrogen. 11.05 g of 3-aminopropyltrimethoxysilane are added dropwise over a period of 10 minutes. The mixture is stirred at 50° C. for 30 minutes. 19.01 g of 3-methylaminopropylamine are subsequently added dropwise over a period of 15 minutes. The mixture is stirred at 50° C. for another 1 hour. Product: $M_n$=600, PDI=1.54, the acrylate groups were reacted completely (determined by means of $^1$H-NMR spectroscopy). The coupling additive obtained is a 40% strength solution of the active substance in Dowanol PMA.

Coupling Additive 11:

11.70 g of 3-methylaminopropylamine, 70.00 g of Dowanol PMA and 23.90 g of 3-aminopropyltrimethoxysilane are placed in a round-bottom flask provided with reflux condenser, gas inlet, temperature sensor, dropping funnel and precision glass stirrer and heated to 40° C. The reaction is carried out under a stream of nitrogen. 54.00 g of the polymeric diacrylate D are added dropwise over a period of 20 minutes, with the temperature not exceeding 45° C. The mixture is stirred for 30 minutes. 3.74 g of Lupasol G20 (water-free, from BASF) dissolved in 70 g of Dowanol PMA are subsequently added and the mixture is stirred for a further 6 hours. $^1$H-NMR spectrum: the acrylate groups are reacted completely in the product. The coupling additive obtained is a 40% strength solution of the active substance in Dowanol PMA.

Coupling Additive 12:

11.10 g of 3-methylaminopropylamine, 120.20 g of Dowanol PMA and 15.03 g of 3-aminopropyltrimethoxysilane are placed in a round-bottom flask provided with reflux condenser, gas inlet, temperature sensor, dropping funnel and precision glass stirrer and heated to 40° C. The reaction is carried out under a stream of nitrogen. 54.00 g of the polymeric diacrylate G are added dropwise over a period of 20 minutes, with the temperature not exceeding 43° C. The mixture is subsequently stirred for a further 6 hours. Product: $M_n$=960, PDI=1.69, the acrylate groups were reacted completely (determined by means of $^1$H-NMR spectroscopy). The coupling additive obtained is a 40% strength solution of the active substance in Dowanol PMA.

Coupling Additive 13:

10.00 g of the polymeric diamine A and 5.08 g of 3-acryloxypropylmethyldimethoxysilane are mixed in a closable screw-cap bottle by means of a magnetic stirrer bar and stirred for 6 hours. Product: acrylate groups no longer detectable (by means of $^1$H-NMR spectroscopy).

Coupling Additive 14:

10.00 g of the polymeric triamine C and 7.43 g of 3-acryloxypropylmethyldimethoxysilane are mixed in a closable screw-cap bottle by means of a magnetic stirrer bar and stirred for 6 hours. Product: acrylate groups no longer detectable (by means of $^1$H-NMR spectroscopy; GPC: $M_n$=1000, PDI=1.61).

Coupling Additive 15:

10.00 g of the polymeric diamine B and 3.64 g of 3-acryloxypropylmethyldimethoxysilane are mixed in a closable screw-cap bottle by means of a magnetic stirrer bar and stirred for 6 hours. Product: acrylate groups no longer detectable (by means of $^1$H-NMR spectroscopy; GPC: $M_n$=1000, PDI=1.30).

Coupling Additive 16:

4.00 g of the polymeric diamine B and 24.04 g of N-ethylpyrrolidone are placed in a closable screw-cap bottle with a magnetic stirrer bar. 2.01 g of 3-(triethoxysilyl)propylsuccinic anhydride are added dropwise and the reaction mixture is stirred for 7 hours. The single-addition product can be detected by means of LC/MS; signals of the unreacted diamine B are no longer present.

Coupling Additive 17:

4.00 g of the polymeric triamine C and 26.20 g of N-ethylpyrrolidone are placed in a closable screw-cap bottle with magnetic stirrer bar. 2.55 g of 3-(triethoxysilyl)propylsuccinic anhydride are added dropwise and the reaction mixture is stirred for 6 hours. The single- and double-addition product can be detected by means of LC/MS; signals of the unreacted triamine C are no longer present.

Coupling Additive 18:

20.00 g of the polymeric diepoxide F, 9.14 g of 3-mercaptopropyltrimethoxysilane and 0.15 g of triethylamine are stirred in a closable screw-cap bottle by means of a magnetic stirrer bar at room temperature for 8 hours. Product: according to NMR spectroscopy, the ratio of silane groups to epoxide groups is 1:1.1 (starting materials: 1:2, theory after complete reaction: 1:1).

Coupling Additive 19:

20.00 g of the polymeric diamine A and 11.51 g of 3-isocyanatopropyltriethoxysilane are stirred in a closable screw-cap bottle by means of a magnetic stirrer bar at room temperature for 3 hours. Product: the isocyanate groups were reacted completely (determined by means of $^{13}$C-NMR spectroscopy).

Coupling Additive 20:

20.00 g of the polymeric triamine C and 8.6 g of 3-isocyanatopropyltrimethoxysilane are stirred in a closable screw-cap bottle by means of a magnetic stirrer bar at room temperature for 3 hours. Product: the isocyanate groups were reacted completely (determined by means of $^{13}$C-NMR spectroscopy; GPC: $M_n$=700, PDI=7.27).

Coupling Additive 21:

65.80 g of 3-methylaminopropylamine, 705.40 g of Dowanol PMA and 134.45 g of 3-aminopropyltrimethoxysilane are placed in a round-bottom flask provided with reflux condenser, gas inlet, temperature sensor, dropping funnel and precision glass stirrer. The reaction is carried out under a stream of nitrogen. 270.00 g of the polymeric diacrylate D are added dropwise over a period of 40 minutes, with the temperature not exceeding 33° C. The mixture is stirred for a further 6 hours. Product: $M_n$=530, PDI=1.57, the acrylate groups were reacted completely (determined by means of 1H-NMR spectroscopy). The coupling additive obtained is a 40% strength solution of the active substance in Dowanol PMA.

Coupling Additive 22:

58.50 g of 3-methylaminopropylamine, 595.00 g of Dowanol PMA and 119.50 g of 3-aminopropyltrimethoxysilane are placed in a round-bottom flask provided with reflux condenser, gas inlet, temperature sensor, dropping funnel and precision glass stirrer. The reaction is carried out under a stream of nitrogen. 270.00 g of the polymeric diacrylate D added dropwise over a period of 40 minutes, with the temperature not exceeding 33° C. After the addition, the reaction mixture is stirred for another 30 minutes. 15.50 g of Epomin SP-003 (water-free polyethylenimine from Sumitomo, Japan having a molar mass of about 300 g/mol) dissolved in 100.00 g of Dowanol PMA are then introduced over a period of 15 minutes. The mixture is stirred for a further 6 hours. Product: $M_n$=510, PDI=1.55, the acrylate groups were reacted completely (determined by means of $^1$H-NMR spectroscopy). The coupling additive obtained is a 40% strength solution of the active substance in Dowanol PMA.

Coupling Additive 23:

50.00 g of the polymeric monoacrylate E and 0.78 g of dibutyltin dilaurate solution (1% in xylene) are placed in a round-bottom flask provided with reflux condenser, gas inlet, temperature sensor, dropping funnel and precision glass stirrer. The reaction is carried out under a stream of nitrogen. The reaction mixture is heated to 80° C. 27.90 g of 3-isocyanatopropyltrimethoxysilane are added dropwise over a period of 5 minutes, with the temperature rising to 98° C. The temperature is reduced to 80° C. again by cooling. The mixture is stirred at 80° C. for another 2.5 hours. Product: $M_n$=910, PDI=1.38, the isocyanate groups were reacted completely, hydroxy end groups are no longer detectable (determined by means of $^{13}$C-NMR spectroscopy); the ratio of acrylate double bonds to silane groups is 1.05:1 (determined by means of $^1$H-NMR spectroscopy; theory: 1:1).

The reaction mixture is subsequently cooled to 30° C. and admixed with 14.65 g of benzylamine. The mixture is stirred for another 8 hours, with the temperature not exceeding 35° C. The acrylate groups were reacted completely (determined by means of $^1$H-NMR spectroscopy).

II Use of the Coupling Additives

"Parts" indicated below are always by weight.

The following commercially available components are used in the illustrative polymer mixtures:

| | |
|---|---|
| Araldite GY783 | Epoxy resin from Huntsman (a low-viscosity, crystallization-resistant epoxy resin based on bisphenol A/F and modified with a reactive diluent) |
| Araldite GY784 | Epoxy resin from Huntsman (a low-viscosity epoxy resin based on bisphenol A and modified with a reactive diluent) |
| SiQ-Epox 4305 | Epoxy resin from SIQ-Chemie, Marl (a low-viscosity, modified, largely crystallization-resistant epoxy resin) |
| Aradur 43 BD | Hardener from Huntsman (a low-viscosity, modified, cycloaliphatic polyamine hardener) |
| Aradur 49 BD | Hardener from Huntsman (a low-viscosity, formulated polyamine adduct) |
| BYK-A 501 | Deaerator from BYK-Chemie GmbH (solution of foam-destroying polymers, silicone-free) |
| BYK-A 530 | Deaerator from BYK-Chemie GmbH (solution of foam-destroying polymers and polysiloxanes) |

Fillers used were: Quartz flour Millisil W 3 and silica sand F32. The products come from Quarzwerke.

(A) Measurement of the flexural strength and amount of alcohol liberated by the coupling additive.

General Method for the Test Plates:

Resin and hardener, if appropriate together with deaerator and coupling additive, are firstly stirred together manually by means of a spatula in a plastic vessel made of polyethylene.

The fillers are added manually and likewise stirred in manually at room temperature by means of a metal spatula until a homogeneous mixture has been obtained. The solid is subsequently dispersed by means of a high-speed mixer (Pendraulik TD-100, toothed disk) at 930 revolutions per minute for a period of one minute.

After dispersion, the mixture is poured into a mold (dimensions: 21 cm×32 cm) and distributed by means of a spatula. The tablet is gently struck against the table 30 times to compact and deaerate the mixture.

The amounts of alcohol liberated during hydrolysis were determined by stoichiometric calculation.

Example A1

No Coupling Additive, Comparative Example

A mixture consisting of 171 parts of Araldite GY783, 95 parts of Aradur 49 BD, 250 parts of Millisil W3, 500 parts of silica sand F32 and 0.1 part of BYK-A 530 is processed according to the above general method to produce test plates. After the complete curing, test specimens corresponding to the test standard DIN EN ISO 178 are cut from the plate. The flexural strength measured is 36.7 N/mm$^2$.

Example A2

Low Molecular Weight Coupling Additive, Not According to the Invention

A mixture consisting of 171 parts of Araldite GY783, 95 parts of Aradur 49 BD, 250 parts of Millisil W3, 500 parts of silica sand F32, 0.1 part of BYK-A 530 and 0.375 part of 3-aminopropyltriethoxysilane (0.05% by weight based on the filler) as coupling additive is processed according to the above general method to produce test plates.

After complete curing, test specimens corresponding to the test standard DIN EN ISO 178 are cut from the plate. The flexural strength measured is 37.5 N/mm$^2$.

Per kg of the total mixture, 234 mg of ethanol are liberated by complete hydrolysis.

Example A3

According to the Invention

A mixture consisting of 171 parts of Araldite GY783, 95 parts of Aradur 49 BD, 250 parts of Millisil W3, 500 parts of silica sand F32, 0.1 part of BYK-A 530 and 0.375 part of the coupling additive 5 (0.05% by weight based on the filler) is processed to the above general method to produce test plates.

After the complete curing, test specimens corresponding to the test standard DIN EN ISO 178 are cut from the plate. The flexural strength measured is 48.7 N/mm$^2$. Per kg of the total mixture, 71 mg of ethanol are liberated by complete hydrolysis.

Example A4

Low Molecular Weight Coupling Additive, Not According to the Invention

A mixture consisting of 171 parts of Araldite GY783, 95 parts of Aradur 49 BD, 250 parts of Millisil W3, 500 parts of silica sand F32, 0.1 part of BYK-A 530 and 0.75 part of 3-aminopropyltriethoxysilane (0.1% by weight based on the filler) as coupling additive is processed to the above general method to produce test plates.

After the complete curing, test specimens corresponding to the test standard DIN EN ISO 178 are cut from the plate. The flexural strength measured is 38.0 N/mm².

Per kg of the total mixture, 461 mg of ethanol are liberated by complete hydrolysis.

Example A5

According to the Invention

A mixture consisting of 171 parts of Araldite GY783, 95 parts of Aradur 49 BD, 250 parts of Millisil W3, 500 parts of silica sand F32, 0.1 part of BYK-A 530 and 0.75 part of coupling additive 7 (0.1% by weight of the solution, i.e. 0.04% of the active substance based on the filler) is processed to the above general method to produce test plates.

After the complete curing, test specimens corresponding to the test standard DIN EN ISO 178 are cut from the plate. The flexural strength measured is 46.7 N/mm².

Per kg of the total mixture, 87 mg of ethanol are liberated by complete hydrolysis.

Example A6

Low Molecular Weight Coupling Additive, Not According to the Invention

A mixture consisting of 171 parts of Araldite GY783, 95 parts of Aradur 49 BD, 250 parts of Millisil W3, 500 parts of silica sand F32, 0.1 part of BYK-A 530 and 2.25 parts of 3-aminopropyltriethoxysilane (0.3% by weight based on the filler) as coupling additive is processed to the above general method to produce test plates.

After the complete curing, test specimens corresponding to the test standard DIN EN ISO 178 are cut from the plate. The flexural strength measured is 44.9 N/mm².

Per kg of the total mixture, 1378 mg of ethanol are liberated by complete hydrolysis.

Example A7

According to the Invention

A mixture consisting of 171 parts of Araldite GY783, 95 parts of Aradur 49 BD, 250 parts of Millisil W3, 500 parts of silica sand F32, 0.1 part of BYK-A 530 and 2.25 parts of the coupling additive 8 (0.1% by weight of the solution, i.e. 0.12% by weight of the active substance based on the filler) is processed to the above general method to produce test plates.

After the complete curing, test specimens corresponding to the test standard DIN EN ISO 178 are cut from the plate. The flexural strength measured is 50.3 N/mm².

Per kg of the total mixture, 164 mg of ethanol are liberated by complete hydrolysis.

Example B1

No Coupling Additive, Comparative Example

A mixture consisting of 171 parts of Araldite 784, 95 parts of Aradur 43 BD, 250 parts of Millisil W3, 500 parts of silica sand F32 and 0.1 part of BYK-A 530 is processed according to the above general method to produce test plates.

After the complete curing, test specimens corresponding to the test standard DIN EN ISO 178 are cut from the plate. The flexural strength measured is 22.4 N/mm².

Example B2

Low Molecular Weight Coupling Additive, Not According to the Invention

A mixture consisting of 171 parts of Araldite 784, 95 parts of Aradur 43 BD, 250 parts of Millisil W3, 500 parts of silica sand F32, 0.1 part of BYK-A 530 and 2.25 parts of 3-aminopropyltriethoxysilane (0.3% by weight based on the filler) as coupling additive is processed according to the above general method to produce test plates.

After the complete curing, test specimens corresponding to the test standard DIN EN ISO 178 are cut from the plate. The flexural strength measured is 33.0 N/mm².

Per kg of the total mixture, 1378 mg of ethanol are liberated by complete hydrolysis.

Example B3

According to the Invention

A mixture consisting of 171 parts of Araldite 784, 95 parts of Aradur 43 BD, 250 parts of Millisil W3, 500 parts of silica sand F32, 0.1 part of BYK-A 530 and 2.25 parts of the coupling additive 8 (0.3% by weight of the solution, i.e. 0.12% by weight of the active substance based on the filler) is processed according to the above general method to produce test plates.

After the complete curing, test specimens corresponding to the test standard DIN EN ISO 178 are cut from the plate. The flexural strength measured is 36.8 N/mm².

Per kg of the total mixture, 164 mg of ethanol are liberated by complete hydrolysis.

Example C1

No Coupling Additive, Comparative Example

A mixture consisting of 171 parts of SiQ-Epox 4305, 95 parts of Aradur 43 BD, 250 parts of Millisil W3, 500 parts of silica sand F32 and 0.1 part of BYK-A 530 is processed according to the above general method to produce test plates. After complete curing, test specimens corresponding to the test standard DIN EN ISO 178 are cut from the plate. The measured flexural strength is 32.2 N/mm².

Example C2

Low Molecular Weight Coupling Additive, Not According to the Invention

A mixture consisting of 171 parts of SiQ-Epox 4305, 95 parts of Aradur 43 BD, 250 parts of Millisil W3, 500 parts of silica sand F32, 0.1 part of BYK-A 530 and 2.25 parts of 3-aminopropyltrimethoxysilane (0.3% by weight based on the filler) as coupling additive is processed according to the above general method to produce test plates.

After complete curing, test specimens corresponding to the test standard DIN EN ISO 178 are cut from the plate. The measured flexural strength is 39.5 N/mm².

Per kg of the total mixture, 1184 mg of methanol are liberated by complete hydrolysis.

Example C3

According to the Invention

A mixture consisting of 171 parts of SiQ-Epox 4305, 95 parts of Aradur 43 BD, 250 parts of Millisil W3, 500 parts of silica sand F32, 0.1 part of BYK-A 530 and 2.25 parts of the coupling additive 9 (0.3% by weight of the solution, i.e. 0.12% by weight of the active substance based on the filler) is processed according to the above general method to produce test plates.

After complete curing, test specimens corresponding to the test standard DIN EN ISO 178 are cut from the plate. The measured flexural strength is 46.1 N/mm$^2$.

Per kg of the total mixture, 122 mg of methanol are liberated by complete hydrolysis.

Example D1

No Coupling Additive, Comparative Example

A mixture consisting of 171 parts of SiQ-Epox 4305, 95 parts of Aradur 49 BD, 250 parts of Millisil W3, 500 parts of silica sand F32 and 0.1 part of BYK-A 501 is processed according to the above general method to produce test plates. After complete curing, test specimens corresponding to the test standard DIN EN ISO 178 are cut from the plate. The measured flexural strength is 49.2 N/mm$^2$.

Example D2

Low Molecular Weight Coupling Additive, Not According to the Invention

A mixture consisting of 171 parts of SiQ-Epox 4305, 95 parts of Aradur 49 BD, 250 parts of Millisil W3, 500 parts of silica sand F32, 0.1 part of BYK-A 501 and 2.25 parts of 3-aminopropyltriethoxysilane (0.3% by weight based on the filler) as coupling additive is processed according to the above general method to produce test plates.

After complete curing, test specimens corresponding to the test standard DIN EN ISO 178 are cut from the plate. The measured flexural strength is 56.1 N/mm$^2$.

Per kg of the total mixture, 1378 mg of ethanol are liberated by complete hydrolysis.

Example D3

Low Molecular Weight Coupling Additive, Not According to the Invention

A mixture consisting of 171 parts of SiQ-Epox 4305, 95 parts of Aradur 49 BD, 250 parts of Millisil W3, 500 parts of silica sand F32, 0.1 part of BYK-A 501 and 2.25 parts of 3-glycidyloxypropyltriethoxysilane (0.3% by weight based on the filler) as coupling additive is processed according to the above general method to produce test plates.

After complete curing, test specimens corresponding to the test standard DIN EN ISO 178 are cut from the plate. The measured flexural strength is 57.2 N/mm$^2$.

Per kg of the total mixture, 899 mg of methanol are liberated by complete hydrolysis.

Example D4

Low Molecular Weight Coupling Additive, Not According to the Invention

A mixture consisting of 171 parts of SiQ-Epox 4305, 95 parts of Aradur 49 BD, 250 parts of Millisil W3, 500 parts of silica sand F32, 0.1 part of BYK-A 501 and 2.25 parts of 3-glycidyloxypropyltriethoxysilane (0.3% by weight based on the filler) as coupling additive is processed according to the above general method to produce test plates.

After complete curing, test specimens corresponding to the test standard DIN EN ISO 178 are cut from the plate. The measured flexural strength is 50.9 N/mm$^2$.

Per kg of the total mixture, 1096 mg of ethanol are liberated by complete hydrolysis.

Example D5

According to the Invention

A mixture consisting of 171 parts of SiQ-Epox 4305, 95 parts of Aradur 49 BD, 250 parts of Millisil W3, 500 parts of silica sand F32, 0.1 part of BYK-A 501 and 2.25 parts of the coupling additive 10 (0.3% by weight of the solution, i.e. 0.12% of the active substance based on the filler) is processed according to the above general method to produce test plates.

After complete curing, test specimens corresponding to the test standard DIN EN ISO 178 are cut from the plate. The measured flexural strength is 60.3 N/mm$^2$.

Per kg of the total mixture, 65 mg of methanol are liberated by complete hydrolysis.

Example D6

According to the Invention

A mixture consisting of 171 parts of SiQ-Epox 4305, 95 parts of Aradur 49 BD, 250 parts of Millisil W3, 500 parts of silica sand F32, 0.1 part of BYK-A 501 and 2.25 parts of the coupling additive 11 (0.3% by weight of the solution, i.e. 0.12% of the active substance based on the filler) is processed according to the above general method to produce test plates.

After complete curing, test specimens corresponding to the test standard DIN EN ISO 178 are cut from the plate. The measured flexural strength is 61.6 N/mm$^2$.

Per kg of the total mixture, 121 mg of methanol are liberated by complete hydrolysis.

Example D7

According to the Invention

A mixture consisting of 171 parts of SiQ-Epox 4305, 95 parts of Aradur 49 BD, 250 parts of Millisil W3, 500 parts of silica sand F32, 0.1 part of BYK-A 501 and 2.25 parts of the coupling additive 12 (0.3% by weight of the solution, i.e. 0.12% of the active substance based on the filler) is processed according to the above general method to produce test plates.

After complete curing, test specimens corresponding to the test standard DIN EN ISO 178 are cut from the plate. The measured flexural strength is 62.8 N/mm$^2$.

Per kg of the total mixture, 88 mg of methanol are liberated by complete hydrolysis.

(B) Measurement of the Viscosity

A mixture consisting of 100 parts of SiQ-Epox 4305, 150 parts of Millisil W8 and 1.5 parts of the substance indicated in table 1a or 1b as coupling additive is homogenized for 2 minutes by means of a Pendraulik TD-100 high-speed mixer using a toothed disk at 1865 revolutions per minute and then allowed to stand at room temperature for 2 minutes.

The viscosity is determined immediately at 23° C. by means of a Brookfield RV viscometer (from Brookfield GmbH, Lorch; spindle 5). The measurements were carried out at 5 and 10 rpm.

TABLE 1a

| Measurement at 5 rpm. | |
| --- | --- |
| Additive | Viscosity in Pa · s |
| Blank | 33.6 |
| 3-aminopropyltriethoxysilane | 59.8 |
| Coupling additive 6 | 19.9 |
| Coupling additive 21 | 20.4 |
| Coupling additive 22 | 19.4 |
| Dowanol PMA (control) | 30.6 |

TABLE 1b

| Measurement at 10 rpm. | |
| --- | --- |
| Additive | Viscosity in Pa · s |
| Blank | 27.7 |
| 3-aminopropyltriethoxysilane | 36.2 |
| Coupling additive 6 | 16.9 |
| Coupling additive 21 | 17.3 |
| Coupling additive 22 | 16.8 |
| Dowanol PMA (control) | 26.0 |

It can be seen from tables 1a and 1b that the viscosity of the mixture is increased by use of 3-aminopropyltriethoxysilane as coupling additive compared to the blank, while the coupling additives according to the invention lead to even a reduction in viscosity compared to the blank. The control in which only the solvent Dowanol PMA was used instead of a coupling additive shows that the viscosity-reducing action of the coupling additives is not attributable to the influence of the solvent present.

We claim:

1. A curable polymer mixture comprising
   I) a) at least one at least oligomeric addition product of at least one aminosilane and optionally thiosilane having at least one hydrolyzable silane group or
      a combination of at least one such aminosilane and/or thiosilane and at least one further monoamine and/or polyamine having at least 2 amino groups
      onto at least one compound having at least two terminal, ethylenically unsaturated double bonds
   and/or
   b) at least one at least oligomeric addition product
      of at least one isocyanatosilane and/or epoxysilane having at least one hydrolyzable silane group
      onto at least one compound having at least one terminal hydroxy group and at least one terminal, ethylenically unsaturated double bond in combination with at least one monoamine and/or polyamine having at least 2 amino groups
   and/or
   c) at least one at least oligomeric addition product
      of at least one silane having at least one hydrolyzable group and at least one (meth)acrylate group
      or at least one silane having at least one hydrolyzable silane group and at least one cyclic dicarboxylic anhydride group
      onto at least one compound having at least two terminal amino groups
   and/or
   d) at least one at least oligomeric addition product
      of at least one isocyanatosilane and/or epoxysilane having at least one hydrolyzable silane group
      onto at least one compound having at least two terminal amino groups optionally in combination with at least one further monoisocyanate and/or an epoxide compound,
   in an amount of less than 5% by weight, based on the total weight of the polymer mixture, as coupling additive,
   II) as binder
      a curable system which comprises at least one polymer having at least two epoxide end groups and can be at least partially cured by interaction of the epoxide groups of this polymer with the amino groups of at least one of the components I) a)-d) and at least one further hardener component and optionally an accelerator,
   III) at least 20% by weight, based on the total weight of the polymer mixture, of inorganic, optionally multiparticulate fillers as aggregates and
   IV) optionally customary auxiliaries.

2. The curable polymer mixture as claimed in claim 1, wherein it contains less than 1% by weight based on the total weight of the polymer mixture, of the coupling additive component I).

3. The curable polymer mixture as claimed in claim 1, wherein the binder component II) is present in an amount of less than 80% by weight, based on the total weight of the polymer mixture.

4. The curable polymer mixture as claimed in claim 1, wherein fillers selected from the group consisting of silicon-containing compounds, aluminosilicates, aluminum silicates and inorganic oxygen compounds of aluminum and magnesium are present as inorganic fillers.

5. The curable polymer mixture as claimed in claim 4, wherein oxidic silicon compounds in the form of continuous fibers, are used as inorganic, silicon-containing compounds.

6. The curable polymer mixture as claimed in claim 4 wherein the inorganic filler component III) is pretreated with at least part of the coupling additive component I).

7. The curable polymer mixture as claimed in claim 1, wherein the polymer having at least 2 epoxide end groups present in the binder component II) is at least one epoxy resin.

8. The curable polymer mixture as claimed in claim 1, wherein the binder component II) comprises aliphatic and/or aromatic polyamines, polycarboxylic acids, cyclic anhydrides or amides thereof, polyphenols, amino resins, phenolic resins, preferably polyamines and/or cyclic carboxylic anhydrides, as hardener component.

9. The curable polymer mixture as claimed in claim 1, wherein the compounds having terminal double bonds which are used for preparing the addition product Ia) have (meth)acrylate groups as double bonds, the compounds used for preparing the addition product Ib) have at least one acrylate or methacrylate group as terminal double bond in addition to at least one terminal hydroxy group,
   the compounds having terminal amino groups which are used for preparing the addition products Ic) and/or Id) have primary, secondary or tertiary amino groups of which at least one is a primary or secondary amino group.

10. The curable polymer mixture as claimed in claim 1, wherein each of the addition products Ia)-1d) has at least one oligomeric compound selected from the group consisting of polyethers, saturated polyesters, polyamides, saturated polyesteramides and saturated polyester polyethers having appropriately functional end groups which reacts with the silane component.

11. The curable polymer mixture as claimed in claim 10, wherein the polyether, saturated polyester or saturated polyester polyether component having in each case
- at least two ethylenically unsaturated double bonds as end groups or
- at least one terminal, ethylenically unsaturated double bond and at least one terminal hydroxy group or
- at least two terminal amino groups or
- at least two terminal epoxide groups.

12. The curable polymer mixture as claimed in claim 1, wherein a compound of the formula

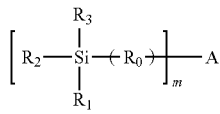

where
- A is an epoxide group, a glycidyloxy group, an isocyanate group, an —SH group, a (meth)acrylate group, a cyclic dicarboxylic anhydride group or an —N(H)—X group, where X is hydrogen, an optionally branched alkyl radical having from 1 to 6 carbon atoms, an aryl radical having from 6 to 10 carbon atoms or a cycloalkyl radical having from 4 to 6 carbon atoms and each of these X radicals is optionally substituted by a primary or secondary amino group, or A is an —NH group when m is the integer 2,
- $R_0$ is an optionally branched alkylene radical having from 1 to 12 carbon atoms, a cycloalkylene radical having from 4 to 6 carbon atoms or an arylene radical having from 6 to 10 carbon atoms,
- $R_1$ is an optionally branched alkyl radical having from 1 to 7 carbon atoms, a halogen, an —O—C(=O)—$R_4$ group or an —O$R_4$ group, where $R_4$ is hydrogen or an optionally branched alkyl radical having from 1 to 7 carbon atoms, or a cycloalkyl radical having from 4 to 6 carbon atoms,
- $R_2$ is an optionally branched alkyl radical having from 1 to 7 carbon atoms, an —O—C(=O)—$R_4$ group, a halogen or an —O$R_4$ group, where $R_4$ is hydrogen or an optionally branched alkyl radical having from 1 to 7 carbon atoms, or a cycloalkyl radical having from 4 to 6 carbon atoms,
- $R_3$ is an —O—C(=O)—$R_4$ group, a halogen or an —O$R_4$ group, where $R_4$ is an optionally branched alkyl radical having from 1 to 7 carbon atoms, or a cycloalkyl radical having from 4 to 6 carbon atoms, and
- m is the integer 1 or 2 is used as a compound having at least one hydrolyzable silane group.

13. The curable polymer mixture as claimed in claim 12, wherein
at least one compound selected from the group consisting of
N-(2-aminoethyl)-3-aminopropylmethyldimethoxysilane,
N-(2-aminoethyl)-3-aminopropyltriethoxysilane,
N-(2-aminoethyl)-3-aminopropyltrimethoxysilane,
3-aminopropyltriethoxysilane,
3-aminopropyltrimethoxysilane,
bis(triethoxysilylpropyl)amine,
bis(trimethoxysilylpropyl)amine
N-methylaminopropyltriethoxysilane, N-phenylaminomethyltriethoxysilane,
N-phenylaminomethyltrimethoxysilane,
N-butylaminopropyltrimethoxysilane,
N-cyclohexyl-3-aminopropyltrimethoxysilane
and mixtures thereof
is used as an aminosilane having at least one hydrolyzable silane group,
at least one compound selected from the group consisting of 3-(triethoxysilyl)propylsuccinic anhydride, 3-(trimethoxysilyl)propylsuccinic anhydride and mixtures thereof is used as a silane having at least one hydrolyzable silane group,
a compound selected from the group consisting of (3-glycidoxypropyl)methyldiethoxysilane, (3-glycidoxypropyl)methyldimethoxysilane, (3-glycidoxypropyl)triethoxysilane, (3-glycidoxypropyl)trimethoxysilane and mixtures thereof
is used as an epoxysilane compound having at least one hydrolyzable silane group.

14. The curable polymer mixture as claimed in claim 1, wherein a combination of an aminosilane and at least one polyamine having at least two amino groups, where the polyamine has at least one primary amino group and in addition at least one secondary amino group or a further primary amino group, is used for preparing the addition product Ia).

15. The curable polymer mixture as claimed in claim 1, wherein
from 5 to 95 mol % of the (meth)acrylic double bonds have been reacted with the aminosilane and optionally thiosilane and the rest of these double bonds have been reacted with at least one polyamine in the addition product Ia), or
the OH groups have been reacted with the epoxysilane or the isocyanatosilane to an extent of more than 80 mol %, and the (meth)acrylic double bonds have been reacted with the monoamine and/or polyamine to an extent of more than 80 mol % in the addition product Ib), or
from 5 to 95 mol % of the amino groups have been reacted with the (meth)acrylatosilanes or the silanes having acid anhydride groups in the addition product Ic), or
from 5 to 95 mol % of the amino groups have been reacted with the isocyanatosilanes and/or epoxysilanes in the addition product Id).

16. The curable polymer mixture as claimed in claim 1, wherein the polymer mixture is a curable polymer concrete mixture.

17. The curable polymer mixture of claim 1 provided with at least 20% by weight, based on the total weight of the polymer mixture, of multiparticulate and optionally dispersible, inorganic fillers or with at least 20% by weight, based on the total weight of the polymer mixture, of continuous, fibrous, inorganic fillers as aggregates and optionally conventional auxiliaries.

18. A process for producing the curable polymer mixture of claim 1, wherein an amount of less than 5% by weight, based on the total weight of the polymer mixture, of at least one of said coupling additives Ia)-1d) is mixed with
a curable system which comprises at least one polymer having at least two epoxide end groups and can be at least partially cured by interaction of the epoxide groups of this polymer with the amino groups of at least one of the components I) a)-d) and at least one further hardener component and optionally an accelerator, and
optionally multiparticulate, optionally dispersible, inorganic fillers as aggregates, in the amount of at least 20% by weight, based on the total weight of the polymer mixture and
optionally conventional auxiliaries or
is combined with at least 20% by weight, based on the total weight of the polymer mixture, of aggregates as continuous, fibrous, inorganic fillers, optionally in the form of woven fabrics or lay-ups and optionally conventional auxiliaries, and the mixture is polymerized to effect curing.

19. The process of claim 18 wherein the inorganic filler component III) is pretreated with at least part of the coupling additive component I).

20. A polymer molding obtained by the process of claim 18.

* * * * *